United States Patent
Uratani et al.

(10) Patent No.: US 10,992,837 B2
(45) Date of Patent: Apr. 27, 2021

(54) INFORMATION PROCESSING APPARATUS, CONTROL METHOD THEREOF, AND STORAGE MEDIUM

(71) Applicant: CANON KABUSHIKI KAISHA, Tokyo (JP)

(72) Inventors: Mitsuru Uratani, Kawasaki (JP); Hiroyuki Sakai, Chigasaki (JP); Yuki Ishida, Kawasaki (JP); Yuki Omagari, Tokyo (JP); Tomohiro Suzuki, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 265 days.

(21) Appl. No.: 16/010,683

(22) Filed: Jun. 18, 2018

(65) Prior Publication Data
US 2019/0007579 A1 Jan. 3, 2019

(30) Foreign Application Priority Data

Jun. 28, 2017 (JP) .............................. JP2017-126735

(51) Int. Cl.
*H04N 1/32* (2006.01)
*G06K 9/20* (2006.01)
(Continued)

(52) U.S. Cl.
CPC ..... *H04N 1/32352* (2013.01); *G06K 9/00442* (2013.01); *G06K 9/2027* (2013.01);
(Continued)

(58) Field of Classification Search
CPC .... G06K 2209/05; G06K 9/3233; G06K 9/42; G06K 9/6256; G06K 9/6267; G06K 9/627; G06T 2207/10024
(Continued)

(56) References Cited

U.S. PATENT DOCUMENTS 6,801,636 B2 10/2004 Murakami et al.
6,959,385 B2 10/2005 Murakami et al.
(Continued)

FOREIGN PATENT DOCUMENTS

CN 101680766 A 3/2010
CN 104054090 A 9/2014
(Continued)

OTHER PUBLICATIONS

Copending, unpublished U.S. Appl. No. 16/013,371, to Hiroyuki Sakai, filed Jun. 20, 2018.
(Continued)

*Primary Examiner* — Charles N Appiah
*Assistant Examiner* — Nicole M Louis-Fils
(74) *Attorney, Agent, or Firm* — Venable LLP

(57) ABSTRACT

To make it possible to easily extract additional information from printed matter by using a built-in camera of a mobile terminal. An information processing apparatus that reads additional information by capturing printed matter in which the additional information is embedded by using a built-in camera, including: a control unit configured to acquire a first captured image obtained by capturing the printed matter under a first image capturing condition and a second captured image obtained by capturing the printed matter under a second image capturing condition different from the first image capturing condition; and an extraction unit configured to extract the additional information by analyzing the first captured image and the second captured image.

18 Claims, 16 Drawing Sheets

(51) Int. Cl.
  *G06K 9/22* (2006.01)
  *G06K 9/00* (2006.01)
  *G06T 1/00* (2006.01)

(52) U.S. Cl.
  CPC ............. *G06K 9/2063* (2013.01); *G06K 9/22* (2013.01); *G06T 1/0021* (2013.01); *H04N 1/32149* (2013.01); *H04N 2201/0084* (2013.01)

(58) Field of Classification Search
  USPC .......................................................... 382/100
  See application file for complete search history.

(56) References Cited

U.S. PATENT DOCUMENTS

| | | | |
|---|---|---|---|
| 9,961,231 B2 | 5/2018 | Iguchi et al. | |
| 2002/0054692 A1* | 5/2002 | Suzuki | H04N 1/00859 382/100 |
| 2002/0059520 A1* | 5/2002 | Murakami | G06T 1/0028 713/176 |
| 2002/0150288 A1* | 10/2002 | Fujiwara | G06T 17/10 382/154 |
| 2003/0210803 A1 | 11/2003 | Kaneda et al. | |
| 2004/0035933 A1* | 2/2004 | Havens | G06K 7/10722 235/454 |
| 2005/0248681 A1* | 11/2005 | Nozaki | H04N 5/232945 348/345 |
| 2008/0089552 A1* | 4/2008 | Nakamura | H04N 21/835 382/100 |
| 2010/0094460 A1* | 4/2010 | Choi | G05D 1/0246 700/251 |
| 2010/0299374 A1* | 11/2010 | Hara | H04N 5/772 707/822 |
| 2013/0181055 A1 | 7/2013 | Liu | |
| 2013/0290036 A1* | 10/2013 | Strange | G06Q 20/3276 705/4 |
| 2016/0037017 A1 | 2/2016 | Morovic | |
| 2016/0080648 A1 | 3/2016 | Iguchi et al. | |
| 2017/0099410 A1 | 4/2017 | Iguchi | |
| 2017/0099411 A1 | 4/2017 | Song | |
| 2018/0328789 A1* | 11/2018 | Kido | G01J 3/462 |

FOREIGN PATENT DOCUMENTS

| | | |
|---|---|---|
| CN | 106575207 A | 4/2017 |
| JP | 2005-026797 | 1/2005 |
| JP | 2007-068098 A | 3/2007 |
| JP | 2016-063262 A | 4/2016 |
| JP | 2017-073652 A | 4/2017 |
| JP | 2017-073653 A | 4/2017 |
| WO | 2007/015452 A1 | 2/2007 |

OTHER PUBLICATIONS

European Search Report issued in corresponding European Application No. 18174571.2 dated Nov. 7, 2018.
Chinese Office Action dated Mar. 3, 2020 in corresponding Chinese Patent Application No. 201810683933.3.
Mar. 23, 2021 Japanese Official Action in Japanese Patent Appln. No. 2017-126735.

* cited by examiner

|   |   |   | -1 | -1 |
|---|---|---|----|----|
|   | -1 | -1 | 2 | 2 |
| -1 | 2 | 2 | -1 | -1 |
| 2 | -1 | -1 |   |   |
| -1 |   |   |   |   |

FIG.8A

|   |   | -1 | 2 | -1 |
|---|---|----|---|----|
|   |   | -1 | 2 | -1 |
|   | -1 | 2 | -1 |   |
|   | -1 | 2 | -1 |   |
| -1 | 2 | -1 |   |   |

FIG.8B

INFORMATION PROCESSING APPARATUS, CONTROL METHOD THEREOF, AND STORAGE MEDIUM

BACKGROUND OF THE INVENTION

Field of the Invention

The present invention relates to a reading technique of information embedded in printed matter.

Description of the Related Art

An information hiding technique is known that adds digital information indicating an author, whether or not use thereof is permitted, and so on to printed matter obtained by printing a photo, a painting, and so on by multiplexing the digital information so as to be difficult to identify visually. It is possible to take out digital information added to printed matter (hereinafter, called "additional information") by capturing the target printed matter by an image capturing device, such as a scanner and a built-in camera of a mobile terminal, and analyzing the captured image. Then, as a technique to appropriately take out additional information, for example, Japanese Patent Laid-Open No. 2005-026797 has disclosed a technique to attach a mark (correction marker) indicating a reference of an image at the time of generating a watermark-embedded image. In the case of this method, by estimating a degree in which a reference point or a reference line is distorted from a predetermined state by using a correction marker to correct an image at the time of taking out additional information, resistance of an electronic watermark for complex geometric transformation, such as projection transformation, is implemented.

In order to correctly take out additional information embedded by the information hiding technique from printed matter, it is generally important to obtain an image of high quality with as less blurring or distortion as possible by performing image capturing at the correct position with respect to the printed matter. However, it is originally difficult to perform image capturing under a stable condition in the case where image capturing is performed by a built-in camera of a mobile terminal, such as a smartphone. For example, the distance from the printed matter is too long or rotation or trapezoidal distortion occurs. In this respect, the above-described method that uses a correction marker premises that image capturing is performed correctly except for geometric distortion. However, in handheld image capturing using a built-in camera of a mobile terminal, camera shake occurs or shadow or light is apt to be cast on the printed matter. Further, even in the case where image capturing is performed in the state where there is no problem other than distortion, on a condition that inclination of a mobile terminal (built-in camera) with respect to the printed matter increases, for example, such a case occurs where only a part of an area in which additional information is embedded is in focus. In such a case, a satisfactory image is not obtained even by performing geometric transformation and it is not possible to correctly extract additional information. Further, in the case where the amount of additional information increases, the basic unit of the area in which additional information is embedded becomes large and image capturing of an image enabling accurate extraction of additional information becomes more difficult. As described above, in the case where additional information is read from printed matter by using the camera function of a mobile terminal, there is a possibility that obtaining a captured image suitable to extraction of additional information becomes complicated.

Consequently, an object of the present invention is to make it possible to easily extract additional information from printed matter by using a built-in camera of a mobile terminal.

SUMMARY OF THE INVENTION

The information processing apparatus according to the present invention is an information processing apparatus that reads additional information by capturing printed matter in which the additional information is embedded by using a built-in camera, including: a control unit configured to acquire a first captured image obtained by capturing the printed matter under a first image capturing condition and a second captured image obtained by capturing the printed matter under a second image capturing condition different from the first image capturing condition; and an extraction unit configured to extract the additional information by analyzing the first captured image and the second captured image.

Further features of the present invention will become apparent from the following description of exemplary embodiments with reference to the attached drawings.

BRIEF DESCRIPTION OF THE DRAWINGS

FIG. 8A and FIG. 8B are diagrams showing coefficients in spatial filters;

DESCRIPTION OF THE EMBODIMENTS

Hereinafter, with reference to the attached drawings, the present invention is explained in detail in accordance with preferred embodiments. Configurations shown in the following embodiments are merely exemplary and the present invention is not limited to the configurations shown schematically.

First Embodiment

Figure 1A:
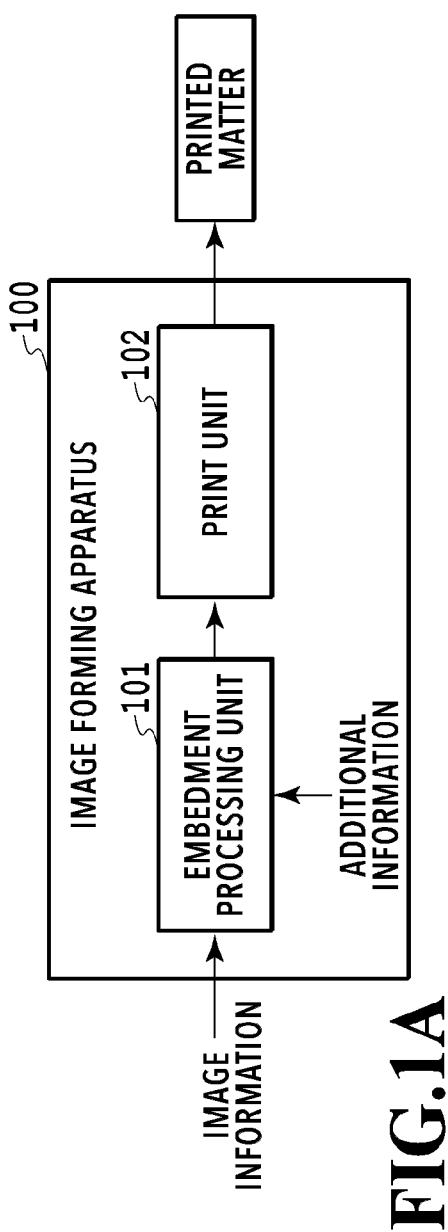
FIG. 1A and FIG. 1B are block diagrams showing main functions in an image forming apparatus and a mobile terminal making up an image processing system.
Figure 1B:
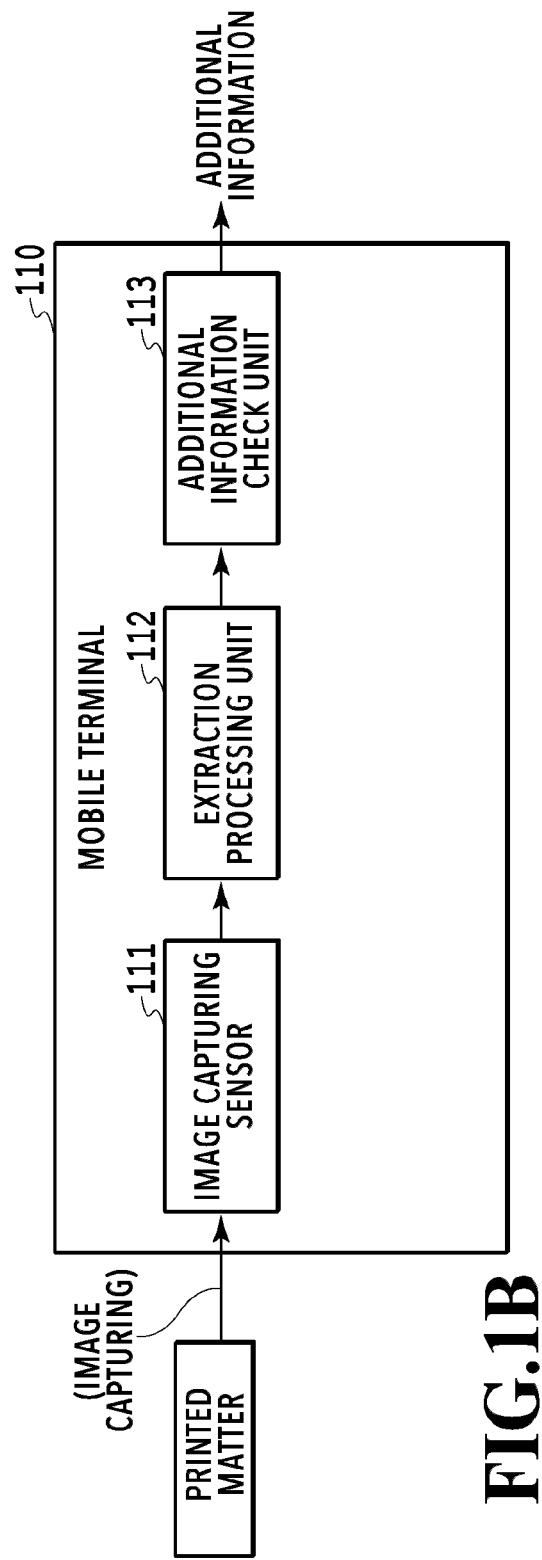

FIG. 1A and FIG. 1B are block diagrams showing main functions in an image forming apparatus 100 and a mobile terminal 110 making up an image processing system according to the present embodiment. The image forming apparatus 100 shown in FIG. 1A is a printing apparatus, for example, such as an MFP (Multi Function Peripheral), having a print function. The mobile terminal 110 shown in FIG. 1B is a mobile information processing apparatus, for example, such as a smartphone and a tablet PC, having a camera function. In the present embodiment, the image forming apparatus 100 outputs printed matter in which additional information is embedded by multiplexing. The additional information is information, for example, such as voices, moving images, still images, and characters, relating to a printed image, or management information, such as the copyright, the date and time of image capturing, the image capturing place, and the image capturer, relating to the image. The additional information may be included as part of image information made up as an image file. Then, the additional information is taken out by capturing the printed matter by a built-in camera (image capturing sensor) 111 of the mobile terminal 110 and analyzing the obtained captured image. There is a case where additional information is called "multiplexed information" or "embedded information".

The image forming apparatus 100 includes an embedment processing unit 101 configured to perform embedment processing by multiplexing additional information in image information and a print unit (printer engine) 102 configured to perform printing processing by using image information in which additional information is embedded. The print unit 102 is a printer, for example, such as an ink jet printer and a laser printer, which implements gradation representation on a printing medium, such as paper, by using pseudo gradation processing. The embedment processing unit 101 is implemented as a printer driver that generates image information to be delivered to the print unit 102, or as application software. Further, the embedment processing unit 101 may also be implemented in an aspect in which it is incorporated in a copy machine, a facsimile, a printer main body, and so on as hardware or software. There is a case where the processing to embed additional information is called "multiplexing processing".

The mobile terminal 110 has an extraction processing unit 112 configured to perform processing to extract additional information from printed matter and an additional information check unit 113 configured to perform error detection of extracted additional information, in addition to the above-described image capturing sensor 111. The extraction processing unit 112 and the additional information check unit 113 may be implemented by software or hardware. There is a case where the processing to take out embedded additional information is called "reading processing" or "separation processing".

In the present embodiment, a configuration in which the embedment processing unit 101 and the print unit 102 are included in the image forming apparatus 100 is explained as an example, but these may be configured as separate apparatuses. For example, the configuration may be one in which an information processing apparatus, such as a PC, has the function of the embedment processing unit 101 and a printing apparatus independent of the information processing apparatus has the function of the print unit 102.

[Basic Configuration of Image Forming Apparatus]

The embedment processing unit 101 embeds (multiplexes) additional information in image information in the state where it is difficult to visually identify the additional information. The print unit 102 performs printing processing based on the image information in which the additional information is embedded created by the embedment processing unit 101.

Figure 2A:
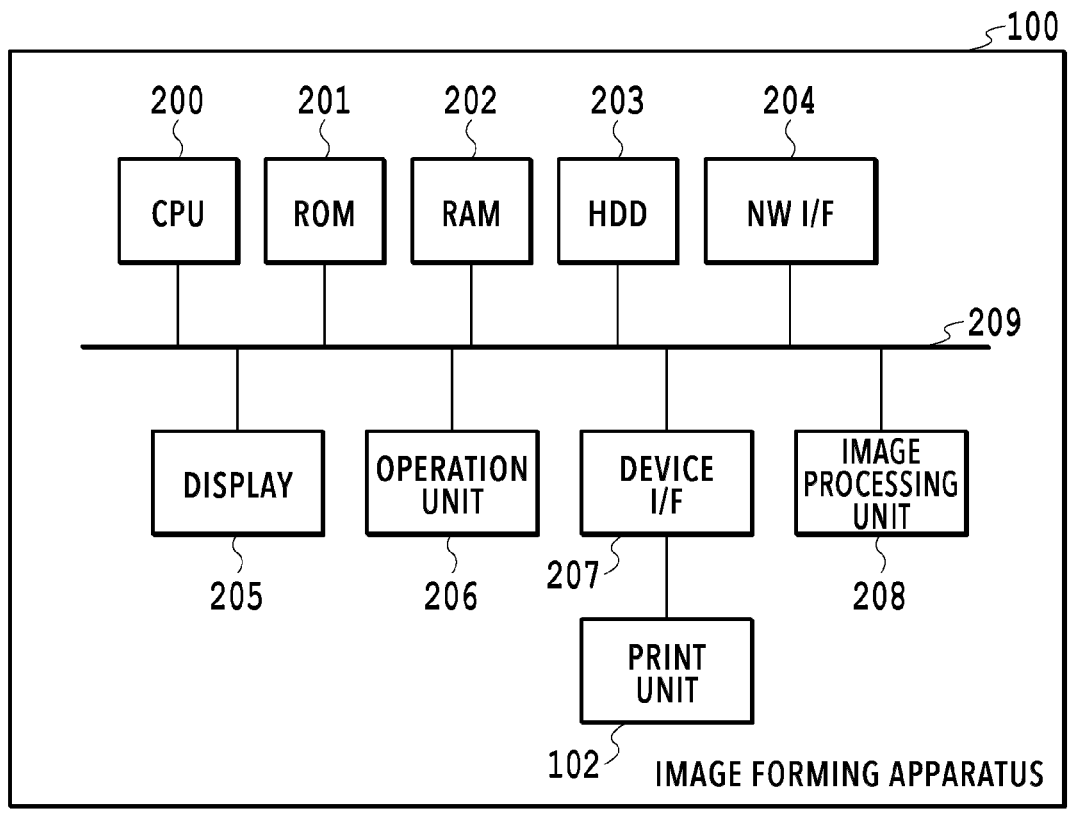
FIG. 2A and FIG. 2B are block diagrams showing hardware configurations of the image forming apparatus and the mobile terminal.

FIG. 2A is a diagram showing an example of a hardware configuration of the image forming apparatus 100. A CPU 200 is a processor that centralizedly controls the image forming apparatus 100. A ROM 201 and an HDD 203 store basic programs and control programs of the image forming apparatus 100, various applications, data, and so on. The CPU 200 implements various functions, such as the embedment processing unit 101 described previously, by reading programs stored in the ROM 201 onto a RAM 202 and executing the programs. The RAM 202 is used also as a work memory of the CPU 200.

A network interface 204 has a configuration in accordance with the aspect of a network, for example, such as a wired network and a wireless network. Further, it is also possible to communicate with the mobile terminal 110 by a plurality of kinds of wireless network whose communication ranges are different, for example, such as near field communication (NFC) whose communication distance is several centimeters.

A display 205 displays each setting screen, a preview screen, and so on to a user. An operation unit 206 has, for example, a keyboard, a touch panel, and so on and is capable of receiving operation instructions from a user. A device I/F 207 connects the print unit 102 (printer engine) and a system bus 209. In FIG. 1A, the print unit 102 is shown, but in accordance with the function that the image forming apparatus 100 has, a processing unit, such as a scanner and a FAX, is connected to the device I/F 207. An image processing unit 208 performs image processing in accordance with uses for image data acquired from the outside. For example, the image processing unit 208 performs processing, such as color space conversion, binarization processing, and enlargement, reduction, and rotation of an image, in accordance with the printing method of the print unit 102.

[Basic Configuration of Mobile Terminal]

In the case where a user performs image capturing of printed matter by using an image reading application installed in the mobile terminal 110, additional information is extracted from a captured image in the extraction processing unit 112 and error detection is performed in the additional information check unit 113.

Figure 2B:
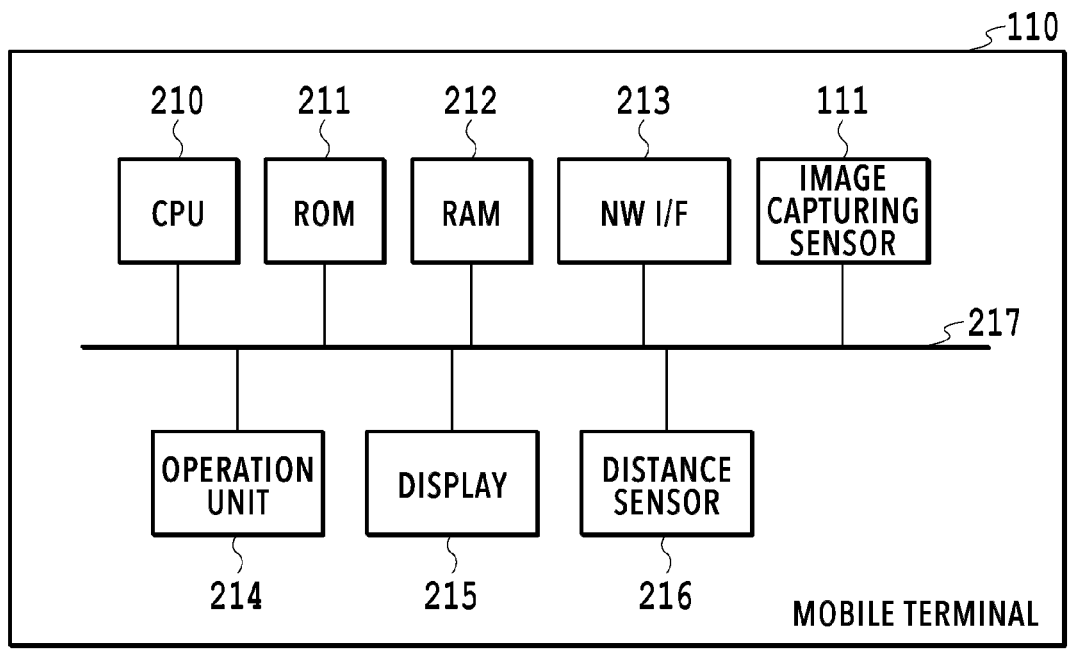

FIG. 2B is a diagram showing an example of a hardware configuration of the mobile terminal 110. The mobile terminal 110 includes a configuration of a general-purpose information processing apparatus. A CPU 210 is a processor that centralizedly controls the mobile terminal 110. The CPU 210 implements various functions including the extraction processing unit 112 and the additional information check unit 113 described previously by reading programs stored in a ROM 211 onto a RAM 212 and executing the programs. The ROM 211 stores basic programs and control programs of the mobile terminal 110, various applications, data, and so on. The RAM 212 is used also as a work memory of the CPU 210. Flowcharts in FIG. 15 and FIG. 16, to be described later, are implemented by the CPU 210 reading a program corresponding to each step and executing the program. In the case where additional information already checked by the additional information check unit 113 is, for example, image information or character information, the contents thereof are output to a display 215 and in the case where the additional information is link information, such as URL, a browser is activated and then a link destination is displayed on the display 215. As a representative cause of an error in the additional information check unit 113, mention is made of a problem of poor image quality, such as camera shake and out of focus, resulting from handheld image capturing by a mobile terminal. The image capturing sensor 111 performs image capturing of a still image by using AF (Auto Focus), AE (Auto Exposure), and AWB (Auto White Balance). In the case where the captured still image has a problem and an error is detected in the extracted additional information, the operation to perform image capturing again by changing the condition is repeated until the check is passed. By doing so, even though the attitude at the time of image capturing is unstable, it is made possible to extract additional information. It may also be possible to cut out a still image from an obtained moving image by performing image capturing in the moving image mode. Further, it may also be possible for a user to perform image capturing while manually changing at least one of the image capturing conditions, such as focus position, exposure, shutter speed, and white balance, without making use of AF, AE, and AWB described above. Furthermore, it may also be possible to change the image capturing condition by another method. For example, it may also be possible for at least one condition to be changed manually by a user, for at least one condition to be fixed, and for at least one condition to be automatically determined by an image reading application.

A network I/F 213 has a configuration in accordance with the aspect of a network, for example, such as a wired network and a wireless network. Further, it is also possible to communicate with the image forming apparatus 100 by a plurality of kinds of wireless network whose communication ranges are different, for example, such as near field communication (NFC) whose communication distance is several centimeters. The display 215 displays each setting screen, a preview screen, and so on to a user. An operation unit 214 has, for example, a hard key and the like and is capable of receiving operation instructions from a user. Further, the operation unit 214 and the display 215 may be integrated into one unit, for example, a so-called touch panel. A distance sensor 216 is a sensor that measures the distance to an object, such as printed mater. Each block shown in FIG. 2B is connected so as to be capable of communication with one another via a system bus 217.

[Embedment Processing of Additional Information]

Figure 3:
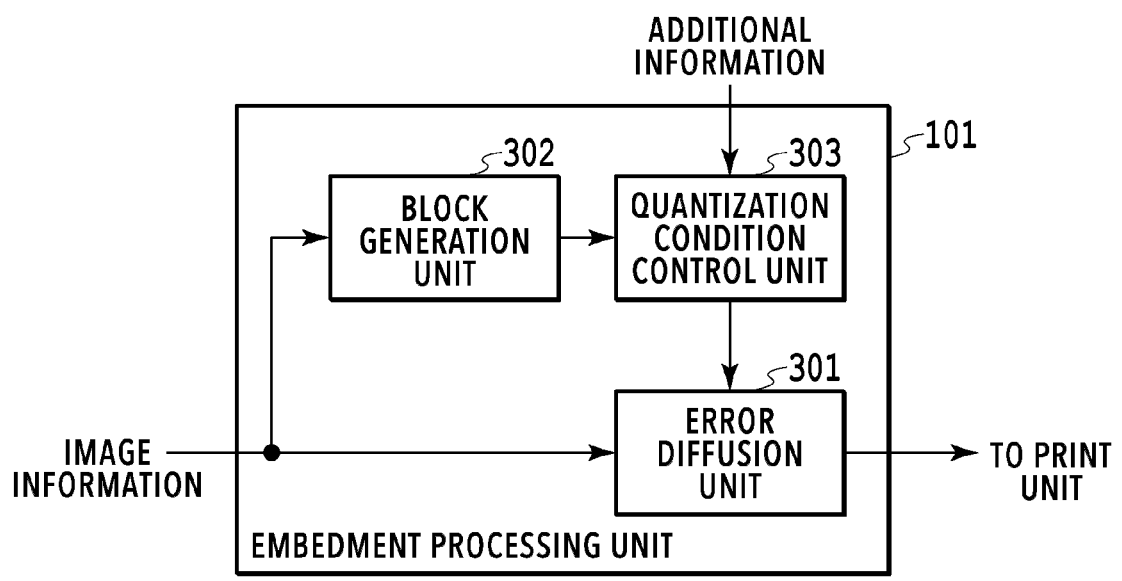
FIG. 3 is a diagram showing an internal configuration of an embedment processing unit.

First, how additional information is embedded in image information is explained. FIG. 3 is a diagram showing an internal configuration of the embedment processing unit 101. The embedment processing unit 101 includes an error diffusion unit 301, a block generation unit 302, and a quantization condition control unit 303.

The error diffusion unit 301 performs quantization processing using the error diffusion method for input image information. Due to this, image information is generated, which represents gradation properties in terms of area by pixel values whose gradation number is smaller than the input gradation number. In the following, explanation is given by taking the case of binary quantization as an example. The block generation unit 302 performs processing to divide input image information into predetermined unit areas (block generation). The unit area is, for example, a rectangular area of 96×96 pixels and hereinafter called a "unit block". The shape of the unit block is not limited to a rectangle and a shape other than a rectangle may be accepted. The quantization condition control unit 303 sets a quantization condition for each unit block obtained by the block generation unit 302 based on additional information input separately from (or along with) the image information.

Figure 4:
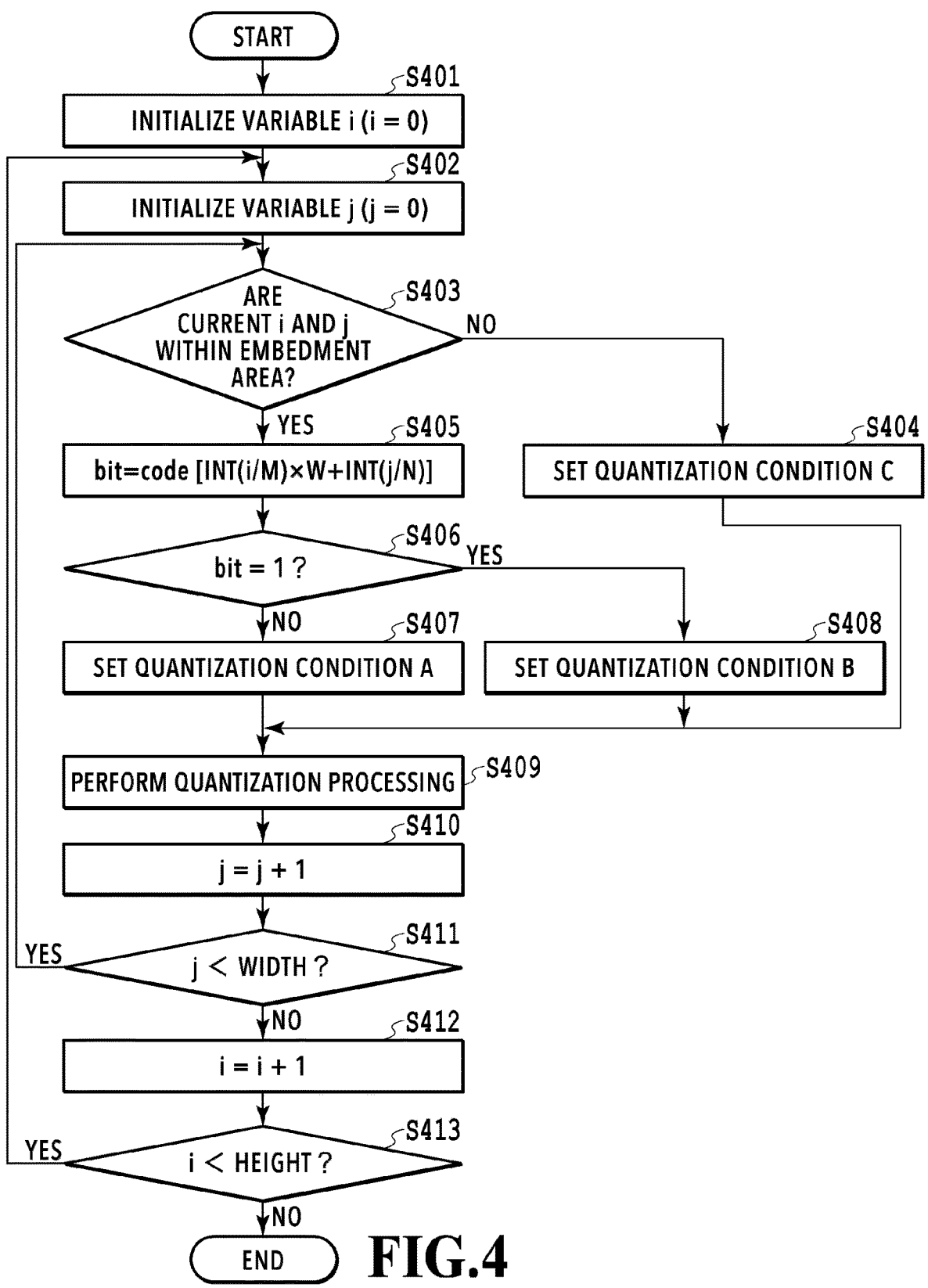
FIG. 4 is a flowchart showing a flow of processing to embed additional information in image information.

Next, a flow of processing to embed additional information in image information is explained with reference to the flowchart in FIG. 4. The series of processing shown in FIG. 4 is implemented by the CPU 200 of the image forming apparatus 100 reading a program stored in the ROM 201 onto the RAM 202 and executing the program.

At step 401, a variable i secured in the RAM 202 is initialized. Here, the variable i is a variable that counts the address in the vertical direction. At step 402, a variable j secured in the RAM 202 is initialized. Here, the variable j is a variable that counts the address in the horizontal direction. Following the above, at step 403, whether or not the pixel (pixel of interest) corresponding to coordinates (i, j), which are the current processing address, belongs to the embedment processing-target area (embedment area) is determined.

Figure 5:
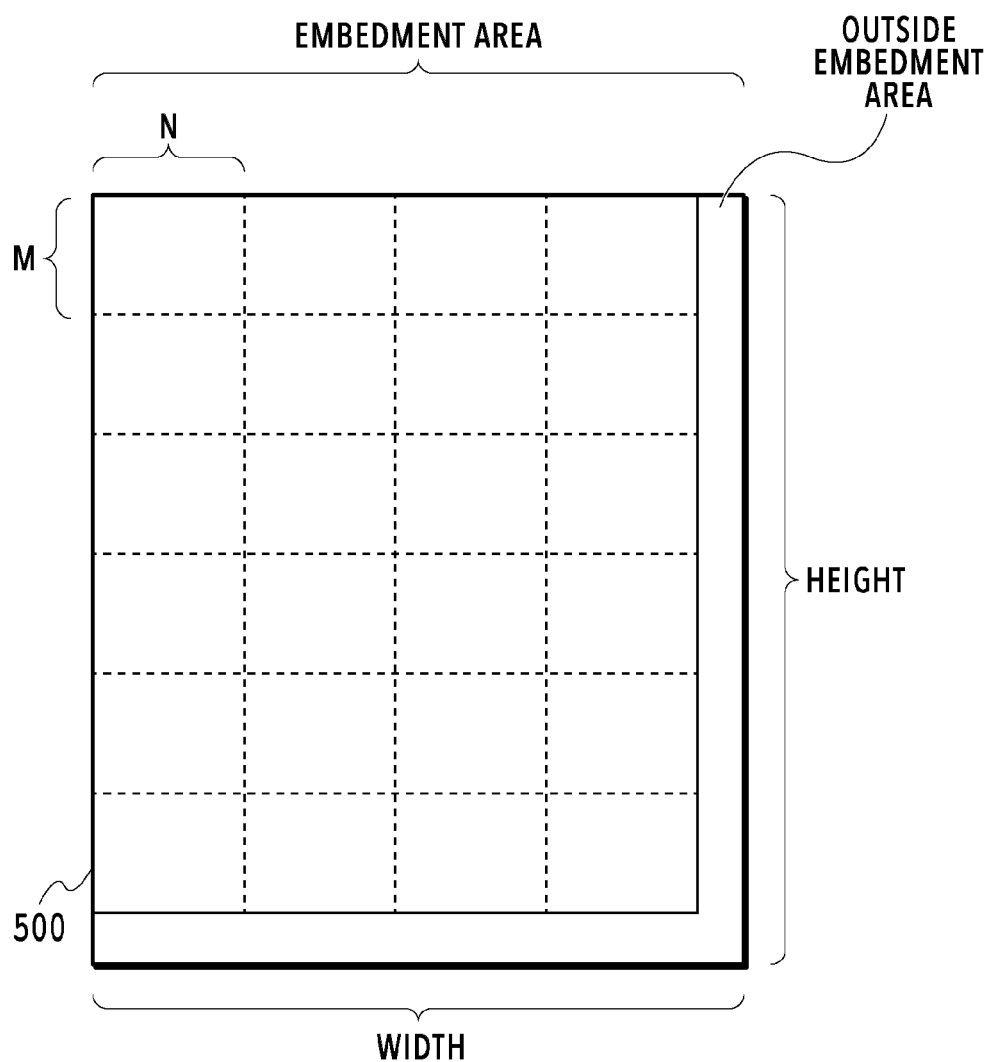
FIG. 5 is an explanatory diagram of an embedment area.

Here, with reference to FIG. 5, the embedment area is explained. FIG. 5 shows one image 500 representing the number of horizontal pixels by WIDTH and the number of vertical pixels by HEIGHT. By taking the top-left point of the image 500 as the origin, block generation is performed with a block whose number of horizontal pixels is N and whose number of vertical pixels is M. Here, the block generation is performed with the origin as a reference point, but a point separate from the origin may be used as a reference point. In order to embed information in this image 500 as much as possible, multiplexed blocks of N×M pixels are arranged in order from the reference point. That is, in the case where the number of blocks that can be arranged in the horizontal direction is taken to be W and the number of blocks that can be arranged in the vertical direction is taken to be H, W and H are expressed by expression (1) and expression (2) below.

$$W = INT(WIDTH/N) \qquad \text{expression (1)}$$

$$H = INT(HEIGHT/M) \qquad \text{expression (2)}$$

Here, INT( ) indicates the integer part of a value within ( ).

The number of pixels, which is the reminder of division in expressions (1) and (2) described above, correspond to the end portion at the time of arranging a plurality of unit blocks of N×M pixels and this portion is outside the embedment area. Explanation is returned to the flow in FIG. 4.

Then, in the case where it is determined that the pixel of interest is not inside the embedment area (outside the embedment area), the processing advances to step 404 and a quantization condition C is set. On the other hand, in the case where it is determined that the pixel of interest is inside the embedment area, the processing advances to step 405 and additional information to be multiplexed is read. Here, for convenience of explanation, additional information is represented by an array, such as code [ ]. For example, in the case where additional information is supposed to be information corresponding to 48 bits, in the array code [ ], one bit is stored in each of code [0] to code [47]. Then, by substituting information within the array code [ ] expressed by expression (3) below in a variable bit secured in the RAM 202, additional information is read.

$$\text{bit}=\text{code}[INT(i/M)\times W+INT(j/N)] \quad \text{expression (3)}$$

At step 406 that follows, whether or not the substituted variable bit is "1" is determined. As described previously, the information within the array code [ ] is stored one bit each, and therefore, the value of the variable bit also indicates one of "0" and "1". Here, in the case where "0" is determined, a quantization condition A is set at step 407. On the other hand, in the case where "1" is determined, a quantization condition B is set at step 408.

Figure 6A:
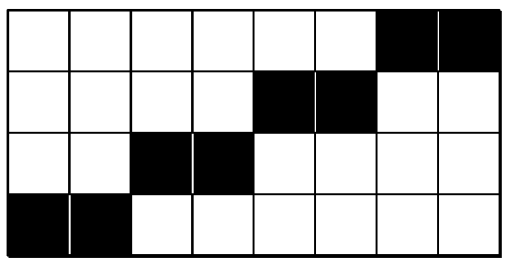
FIG. 6A to FIG. 6D are explanatory diagrams of a quantization condition.
Figure 6B:
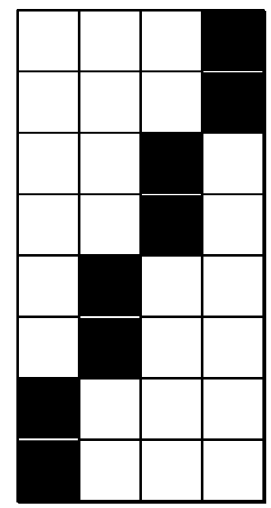
Figure 6C:
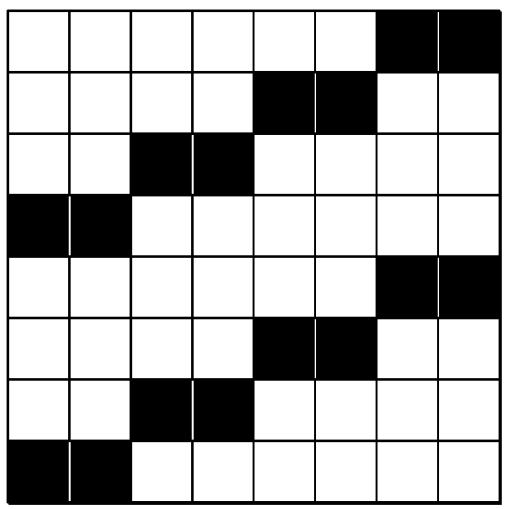
Figure 6D:
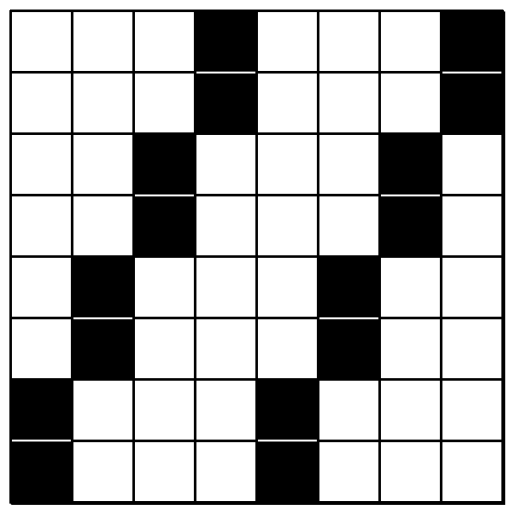

Here, the quantization conditions A, B, and C are explained. The quantization conditions in the error diffusion method include various factors and here, a quantization threshold value. The quantization condition C that is set at step 404 is used in the case where the pixel of interest is outside the embedment area, and therefore, the quantization threshold value may be any condition. As described previously, in the case where the quantization levels are two values in gradation representation in which one pixel is eight bits, "255", which is the maximum value, and "0", which is the minimum value, are quantization representative values and "128", which is the intermediate value, is set as the quantization threshold value in many cases. The quantization condition C in the present embodiment is also set to a condition whose quantization threshold value is taken to be a fixed value of "128". The quantization condition A that is set at step 407 and the quantization condition B that is set at step 408 are used in the case where the pixel of interest is inside the embedment area and the unit block is made up, and therefore, it is necessary to make a difference in image quality by different quantization conditions. However, it is necessary for the difference in image quality to be represented so as not to be visually identified easily but to be capable of being identified easily from the paper surface. FIG. 6A and FIG. 6B are explanatory diagrams of the quantization conditions A and B. FIG. 6A is a diagram showing a period of a change in the quantization threshold value in the quantization condition A. In FIG. 6A, it is assumed that one cell corresponds to one pixel and a white cell is a fixed threshold value and a black cell is a fluctuating threshold value. That is, in the example in FIG. 6A, a matrix of eight horizontal pixels and four vertical pixels is formed and only for black cells, a largely shifted value is set as a threshold value. FIG. 6B is a diagram showing a period of a change in the quantization threshold value in the quantization condition B. In the example in FIG. 6B, different from FIG. 6A, a matrix of four horizontal pixels and eight vertical pixels is formed and similarly, only for black cells, a largely shifted value is set as a threshold value. Then, in the case where one pixel is an 8-bit tone level value, for example, as a fixed threshold value, "128" is set and as a largely shifted value, "10" is set. In the case where the quantization threshold value becomes small, the quantized value of the pixel of interest easily becomes "1". That is, in the arrangement of the black cells both in FIG. 6A and in FIG. 6B, the quantized value "1" becomes more likely to be put side by side. In other words, the unit block of N×M pixels in which dots occur in the arrangement of black cells shown in FIG. 6A and the unit block of N×M pixels in which dots occur in the arrangement of black cells shown in FIG. 6B exist mixedly. Some change in the quantization threshold value in the dither diffusion method does not affect significantly in terms of image quality. In the ordered dither method, depending on the dither pattern to be used, the image quality of gradation representation is affected significantly. However, in the error diffusion method regularly given a change in the quantization threshold value, the gradation representation determining the image quality is the error diffusion method, and therefore, even in the case where the arrangement of dots changes somewhat or the occurrence of texture changes, the image quality of gradation representation is hardly affected. Even in the case where the quantization threshold value changes, the error that causes a difference between the signal value and the quantized value is diffused to the peripheral pixels, and therefore, the input signal value is saved in a macro manner. That is, concerning the arrangement of dots and the occurrence of texture in the error diffusion method, it can be said that redundancy is extremely large. It may also be possible to perform embedment of additional information by taking FIG. 6C in which a pattern of 8×8 pixels combining the pattern in FIG. 6A is taken to be the minimum unit and FIG. 6D in which a pattern of 8×8 pixels combining the pattern in FIG. 6B is taken to be the minimum unit as the quantization conditions A and B, respectively. Explanation is returned to the flow in FIG. 4.

At step 409, based on the quantization conditions set as described above, quantization processing by the error diffusion method is performed. Then, at step 410, the variable j is updated (incremented) and at step 411, whether or not the variable j after updating is less than the number of horizontal pixels WIDTH is determined. In the case where the variable j is determined to be less than WIDTH, the processing returns to step 403, and the pixel located on the right side is determined to be the pixel of interest and the processing is repeated. On the other hand, in the case where the variable j is determined not to be less than WIDTH (in the case where the processing in the horizontal direction is completed for the number of pixels corresponding to WIDTH), the processing advances to step 412 and the variable i is updated (incremented). Then, at step 413, whether or not the variable i after updating is less than the number of vertical pixels HEIGHT is determined. In the case where the variable i is determined to be less than HEIGHT, the processing returns to step 402, and the pixel located below is determined to be the pixel of interest and the processing is repeated. On the other hand, in the case where the variable i is determined not to be less than HEIGHT (in the case where the processing in the vertical direction is completed for the number of pixels corresponding to HEIGHT), this processing is terminated.

The above is the contents of the embedment processing of additional information. In this manner, the embedment processing of additional information is performed in accordance with the quantization condition set for each unit block. As described above, in the present embodiment, multiplexing is implemented by superposing predetermined periodicity indicating a sign on the quantization threshold value of the error diffusion method. However, it may also be possible to implement multiplexing by another superposition method. For example, it may also be possible to implement multiplexing by a method of directly superposing periodicity on the RGB values (luminance information). Alternatively, it may also be possible to implement multiplexing by a method of superposing periodicity by separating RGB values into another color space information (for example, CIE L*a*b, YCrCb signal), such as luminance-color difference information. Alternatively, it may also be possible to implement multiplexing by a method of superposing periodicity by separating RGB values into ink colors (for example, CMYK signal).

[Extraction Processing of Additional Information]

Figure 7:
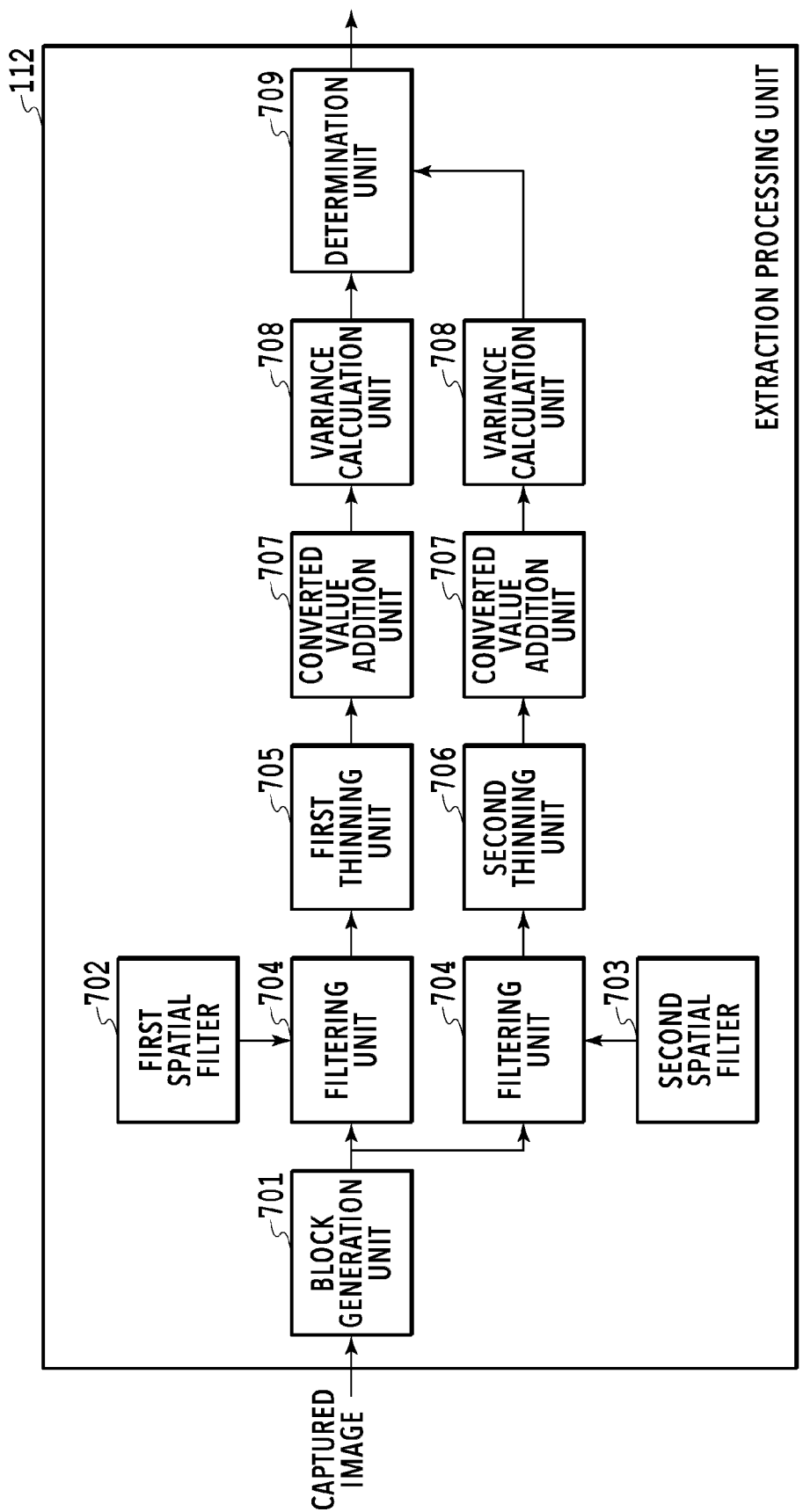
FIG. 7 is a block diagram showing an internal configuration of an extraction processing unit.

Next, extraction of additional information is explained. In the present embodiment, additional information is extracted by making use of a plurality of images captured by the mobile terminal 110. FIG. 7 is a block diagram showing an internal configuration of the extraction processing unit 112. Explanation is given on the assumption that additional information is extracted from printed matter in which the additional information is embedded by the embedment processing unit 101 described previously. As a matter of course, the amount of additional information per unit block at the time of embedment in the embedment processing unit 101 and the amount of extracted information per unit block at the time of extraction in the extraction processing unit 112 are equal.

Image information obtained by capturing printed matter by the mobile terminal 110 is first input to a block generation unit 701. Here, it is preferable for the resolution (image capturing resolution) of the image capturing sensor 111 of the mobile terminal 110 to be higher than or equal to the printing resolution at the time of creating printed matter. In order to accurately read scattered dot information on the printed matter, it is necessary for the image capturing sensor 111 side to have a resolution higher than or equal to twice that on the printing apparatus side by the sampling theorem. However, with a resolution higher than or equal thereto, it is possible to determine scattered dots.

The block generation unit 701 divides an image into unit blocks made up of a number of horizontal pixels P and a number of vertical pixels Q. The size of this unit block is smaller than or equal to that of the unit block at the time of embedment. That is, between the unit block at the time of embedment and the unit block at the time of extraction, a relationship of P≤N and Q≤M holds. In the following, explanation is given on the assumption that the size of the unit block is the same at the time of embedment and at the time of extraction (P=N and Q=M).

As spatial filters, a first spatial filter 702 and a second spatial filter 703 whose characteristics are different from each other exit. A filtering unit 704 performs digital filtering to calculate a product and a sum with a peripheral pixel. The coefficients in the first spatial filter 702 and the second spatial filter 703 are set in accordance with the period of a fluctuation threshold value of the quantization condition. Here, it is assumed that the quantization conditions are set by using the two kinds of periodicity shown in FIG. 6A and FIG. 6B and additional information is embedded. The coefficients in the first spatial filter 702 and the second spatial filter 703 used in the extraction processing unit 112 in this case are, for example, those as shown in FIG. 8A and FIG. 8B, respectively. In the spatial filters of 5×5 pixels shown in FIG. 8A and FIG. 8B, the pixel located at the center thereof is the pixel of interest and the other 24 pixels are peripheral pixels. In FIG. 8A and FIG. 8B, the blank portion where there is no value indicates the pixel whose filer coefficient is "0". As is obvious from each filter coefficient shown in FIG. 8A and FIG. 8B, each spatial filter is an edge-enhancement filter. Then, the directionality of the edge to be enhanced and the directionality of the fluctuation threshold value at the time of multiplexing coincide with each other in the combination of FIG. 8A and FIG. 6A and in the combination of FIG. 8B and FIG. 6B, respectively. That is, the spatial filters are created so that FIG. 8A coincides with FIG. 6A and FIG. 8B coincides with FIG. 6B.

As thinning units, a first thinning unit 705 corresponding to the first spatial filter 702 and a second thinning unit 706 corresponding to the second spatial filter 703 exist. Then, in each thinning unit, thinning processing is performed by separating the signal (hereinafter, "converted value") after filtering within the unit block into the regularity of periodicity and the regularity of phase, respectively. That is, between the first thinning unit 705 and the second thinning unit 706, the periodicity of thinning is different from each other and in each unit, a plurality of pieces of thinning processing is performed by changing the phase.

A converted value addition unit 707 adds the converted values of the pixels thinned by the first and second thinning units 705 and 706, respectively, for each phase. The thinning processing and the addition processing of the converted value correspond to extracting power of a predetermined frequency vector enhanced by the spatial filter.

Figure 9:
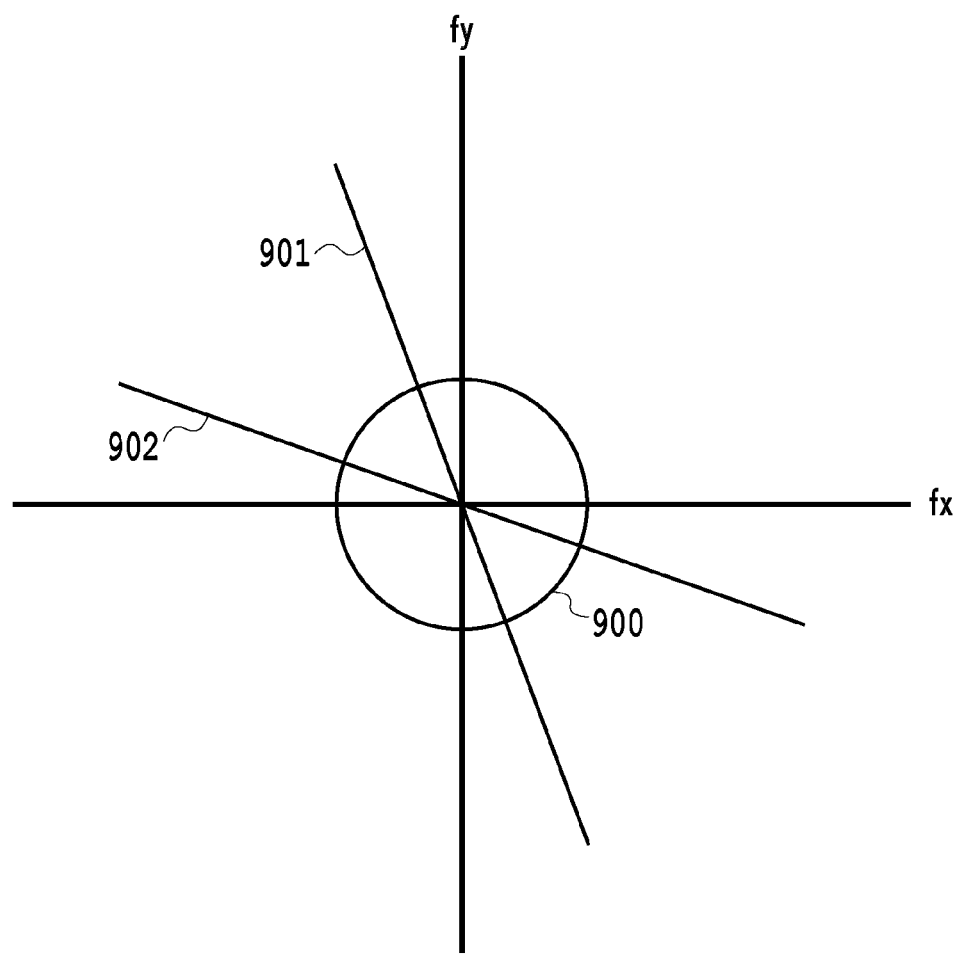
FIG. 9 is a diagram showing a two-dimensional frequency area.

A variance calculation unit 708 calculates a variance of a plurality of added values added for each phase in each periodicity. A determination unit 709 determines the embedded sign based on the variance calculated in each periodicity. FIG. 9 is a diagram showing a two-dimensional frequency area. The horizontal axis represents the frequency in the horizontal direction and the vertical axis represents the frequency in the vertical direction. The origin, which is the center, represents the direct-current component and as becoming more distant from the origin, the area becomes a higher-frequency area. In FIG. 9, a circle 900 whose center is the intersection of the horizontal axis and the vertical axis represents a cut-off frequency by error diffusion. The filter characteristics in the error diffusion method indicate the characteristics of a high-pass filter whose low-frequency area is cut off and the frequency to be cut off changes in accordance with the density of a target image. In the present embodiment, the frequency characteristics that occur after quantization change in accordance with the set quantization threshold value and in the example of the quantization threshold value in FIG. 6A, a large power spectrum occurs on the frequency vector indicated by a straight line 901 in FIG. 9. Further, in the example of the quantization threshold value in FIG. 6B, a large power spectrum occurs on the frequency vector indicated by a straight line 902 in FIG. 9. At the time of extraction of additional information, by detecting the frequency vector on which this large power spectrum occurs, the determination of the embedded sign is performed. In the present embodiment, it is assumed that each frequency vector is individually enhanced and extracted. From the above, it can be said that the spatial filters shown in FIG. 8A and FIG. 8B described previously are high-pass filters having the directionality of a specific frequency vector. That is, with the spatial filter in FIG. 8A, it is made possible to enhance the frequency vector on the straight line 901 in FIG. 9 and with the spatial filter in FIG. 8B, it is made possible to enhance the frequency vector on the straight line 902 in FIG. 9. For example, it is assumed that by the setting of the quantization threshold value shown in FIG. 6A, a large power spectrum has occurred on the frequency vector of the straight line 901 in FIG. 9. At this time, with the spatial filter in FIG. 8A, the amount of change in power spectrum is amplified, but with the spatial filter in FIG. 8B, the amount of change is hardly amplified. That is, in the case where filtering is performed in parallel for a plurality of spatial filters, amplification occurs only in the spatial space where the frequency vectors coincide and there is almost no amplification in the spatial filters other than that. Consequently, it is possible to easily determine on which frequency vector a large power spectrum has occurred.

The additional information extracted by the extraction processing unit 112 is checked for its accuracy by the additional information check unit 113 and in the case where there is an error, the reading is determined to be an error. As a check method, it may be possible to use a publicly known technique, such as CRC (Cyclic Redundancy Check), but such a technique is not the feature of the present invention, and therefore, detailed explanation thereof is omitted here.

[Review of Problem of the Present Invention]

Figure 10A:
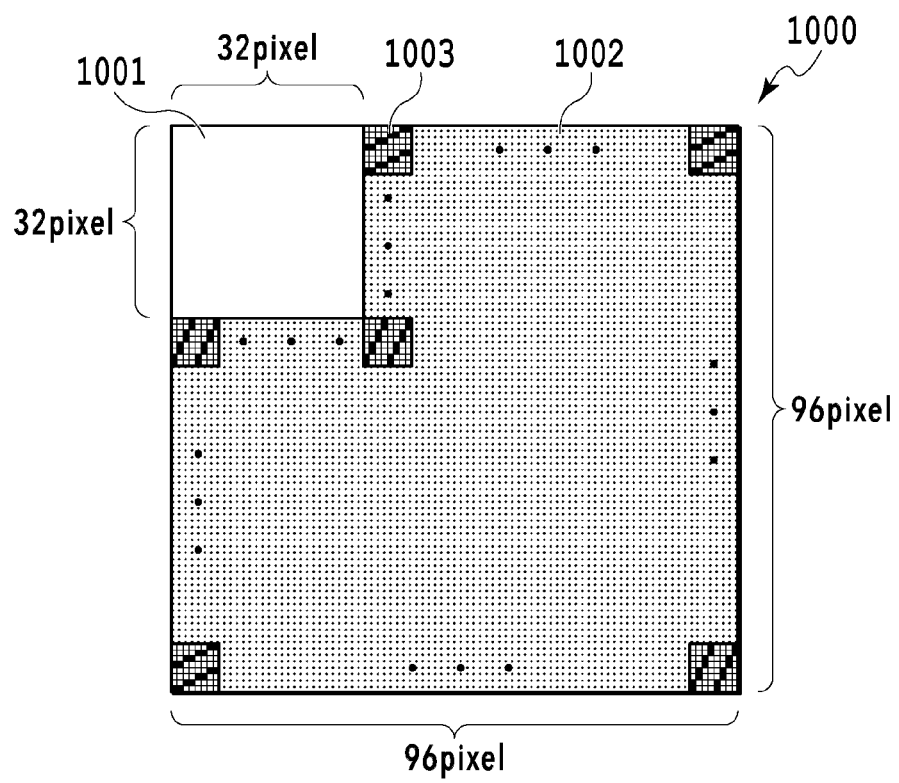
FIG. 10A and FIG. 10B are diagrams showing an example of a unit block.
Figure 10B:

Here, the problem of the present invention is reviewed. FIG. 10A is a diagram showing a unit block in the case where additional information is embedded under the quantization conditions shown in FIG. 6C and FIG. 6D described previously. A thick-line rectangle 1000 represents one unit block and by reading all the pieces of information within the unit block 1000, it is possible to extract embedded additional information. The unit block 1000 is made up of an anchor portion indicated by a white area 1001 and a data portion indicated by a dot area 1002. The anchor portion 1001 is an area having a predetermined size (for example, 32×32 pixels), which is made use of to specify the origin of the unit block 1000 at the time of reading of additional information. Then, to the anchor portion 1001, information is not added (blank) or arbitrary information indicating that the area is an anchor is embedded. The data portion 1002 is covered over with patterns of 8×8 pixels 1003 shown in FIG. 6C or FIG. 6D. Here, it is assumed that the size of the unit block 1000 is 96×96 pixels and the data portion 1002 is covered over with the 128 patterns 1003. In this case, one pattern 1003 can represent 1-bit information, and therefore, there is an amount of 128-bit information in the entire unit block 1000. In the present embodiment, the 128 bits are further separated into eight groups, each group having a total of 16 bits of "DATA 12 bit" and "CRC 4 bit", as shown in FIG. 10B. In this case, the actual capacity of data is 12 bits×8 groups=96 bits.

Figure 11B:
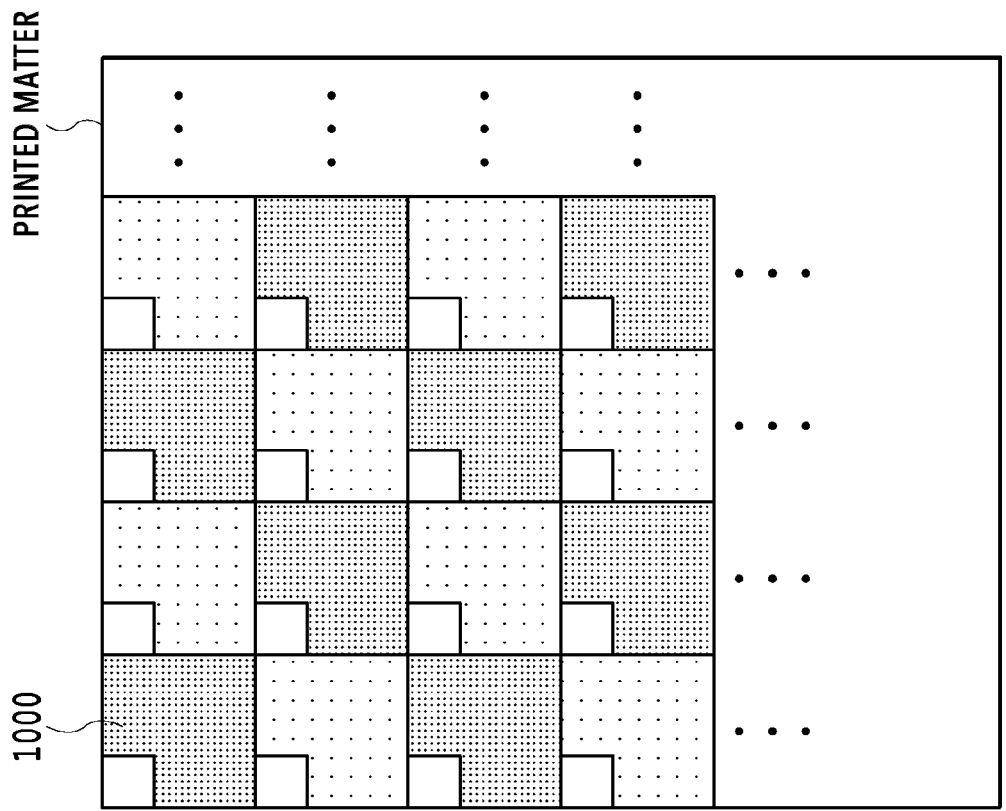
FIG. 11A and FIG. 11B are diagrams showing the way additional information represented by a unit block is embedded repeatedly.
Figure 11A:
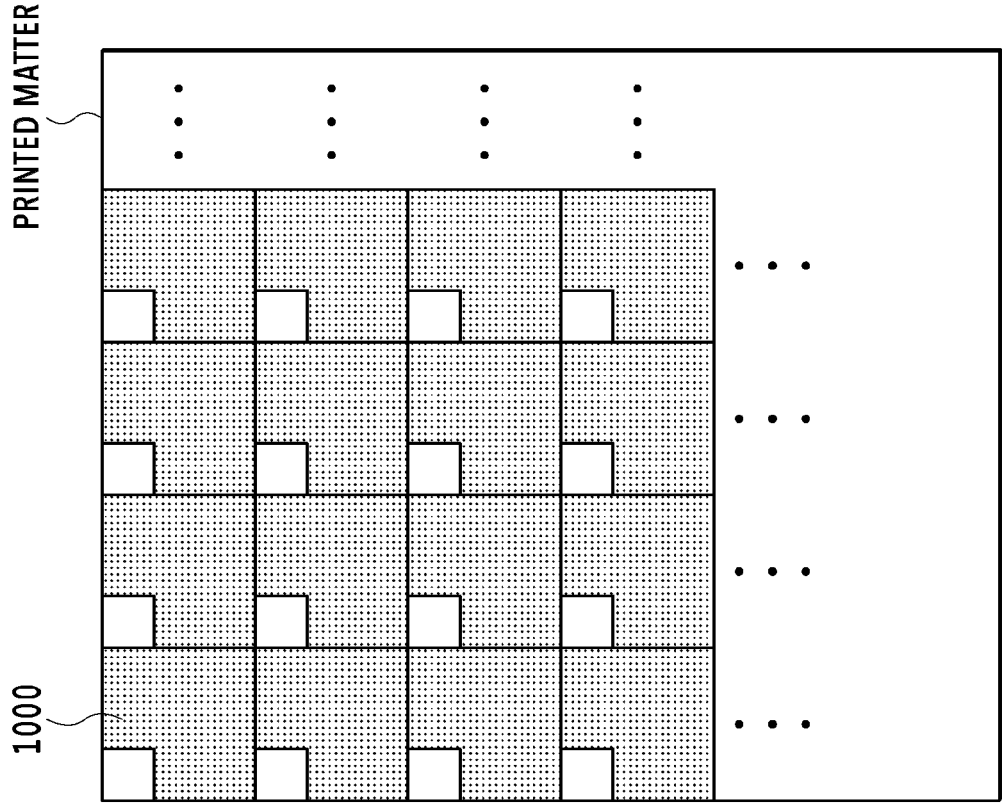
Figure 12A:
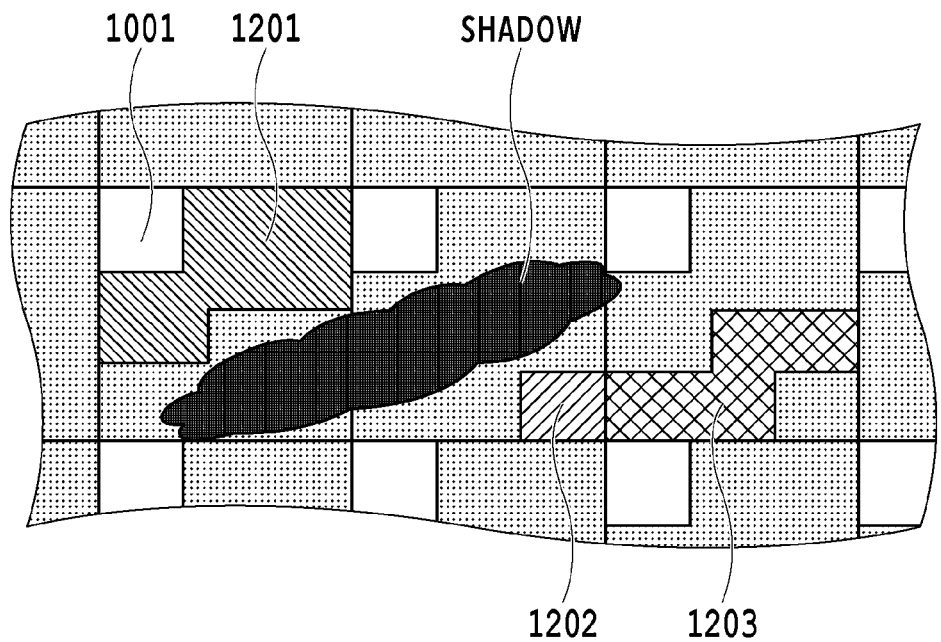
FIG. 12A and FIG. 12B are diagrams showing the way additional information corresponding to one set is read from a plurality of unit blocks.
Figure 12B:
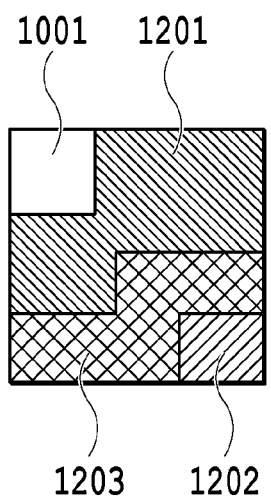

FIG. 11A is a diagram showing the way additional information represented by the unit block 1000 shown in FIG. 10A is embedded repeatedly within printed matter. That is, additional information is multiplexed on image information on the printed matter and embedded repeatedly in units of blocks. In order to read the additional information embedded in the printed matter, it is only required to be capable of reading one unit block of a plurality of unit blocks embedded repeatedly and it is not necessarily required to read all the unit blocks. For example, as shown in FIG. 12A, there is a case where a shadow is cast at the time of image capturing by the mobile terminal 110. In this case, it is not possible to cover all of the above-described eight groups by one unit block alone, and therefore, there is a case where only several groups can be read. Even in such a case, by compensating for information of the portions that cannot be read because of the cast shadow by a group of other unit blocks, it is made possible to read the additional information corresponding to one unit block. That is, as shown in FIG. 12B, by integrating three data portions corresponding to an area 1201 with diagonal lines extending downward to the right, an area 1202 with diagonal lines extending downward to the left, and an area 1203 with a diagonal grid, each being read from different unit blocks, all the data portions corresponding to one unit blocks are obtained. Due to this, even in the case where the entire unit block is not captured sharply, it is possible to read additional information corresponding to the unit block. However, there may be a case where unit blocks capable of mutual complementation do not exist in a captured image obtained by one-time image capturing. For example, in the case where two adjacent unit blocks make up a set corresponding to one piece of additional information as shown in FIG. 11B, the possibility becomes strong that all unit blocks capable of mutual complementation do not exist in a captured image obtained by one-time image capturing. Then, in the case where the number of unit blocks making up one set becomes three or more, it becomes more difficult to completely extract additional information as the number increases.

As described above, in the case of an image obtained by held image capturing using the mobile terminal 110, there may occur a case where additional information cannot be taken out accurately even by linking data portions partially read from a plurality of unit blocks. With such circumstances in mind, in the present invention, a plurality of captured images whose image capturing conditions are different is used for extraction of additional information. In the following, detailed explanation is given.

[Acquisition of Captured Image Suitable to Extraction of Additional Information]

Figure 13:
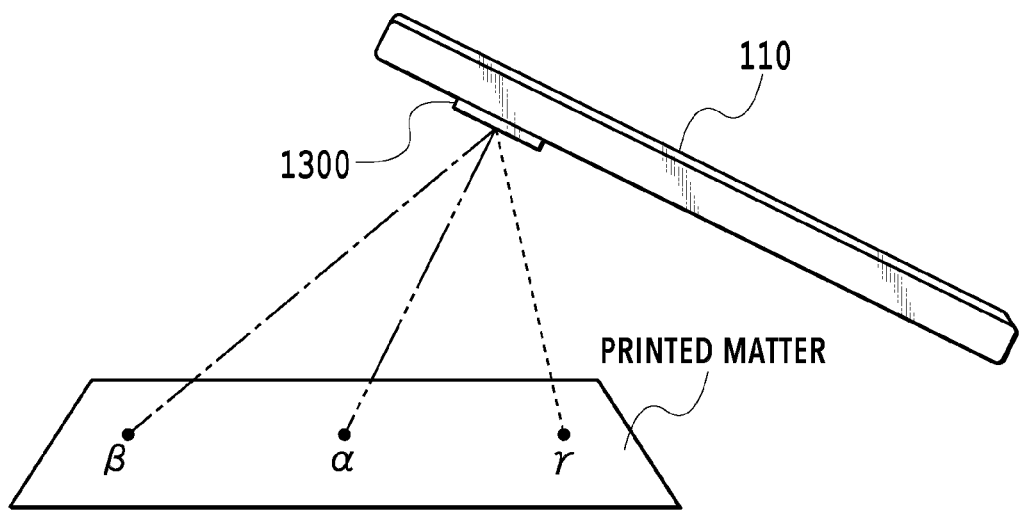
FIG. 13 is a diagram showing the way handheld image capturing is performed for printed matter in the state where a mobile terminal is inclined.
Figure 14:
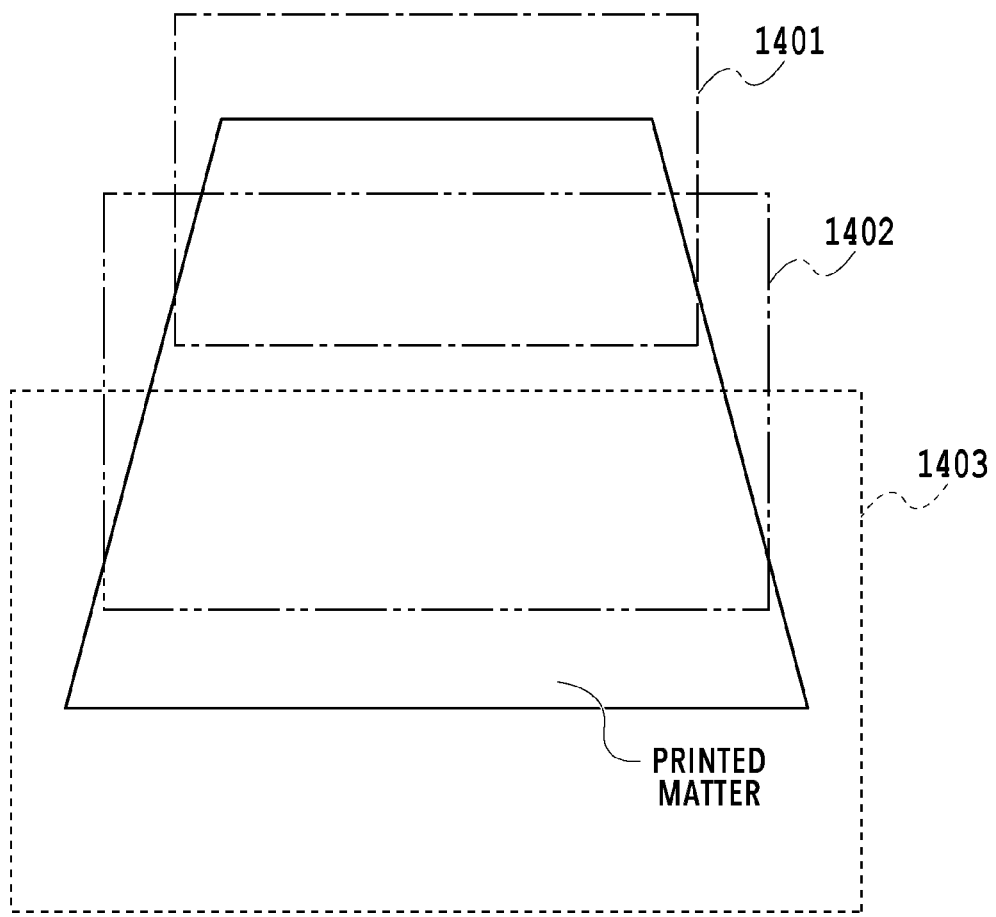
FIG. 14 is a diagram showing the way printed matter is viewed through a lens of a mobile terminal at the time of handheld image capturing.

FIG. 13 shows the way handheld image capturing is performed in the state where the mobile terminal 110 is inclined with respect to the printed matter shown in FIG. 11A and FIG. 11B. Further, FIG. 14 shows views of the printed matter through a lens 1300 of the mobile terminal 110 at the time of image capturing. As is obvious from FIG. 14, the shape of the printed matter changes into a trapezoid with the side located on the front being the long side and it is known that a distortion occurs. Then, the distances between each of positions α, β, and γ (see FIG. 13) on the printed matter and the lens 1300 of the mobile terminal 110 are quite different. Here, it is assumed that an image without blurring in a range indicated by a two-dot chain line 1402 in FIG. 14 is obtained in the case where image capturing is performed by bringing the position α into focus. In the case where a large shadow is captured in the captured image thus obtained, extraction of additional information will fail. Consequently, in the case where extraction of additional information fails, image capturing is performed by changing the image capturing condition. For example, an image without blurring in a range indicated by a one-dot chain line 1401 is captured by bringing the position β on the printed matter into focus, an image without blurring in a range indicated by a broken line 1403 is captured by bringing the position γ into focus, and so on.

Figure 15:
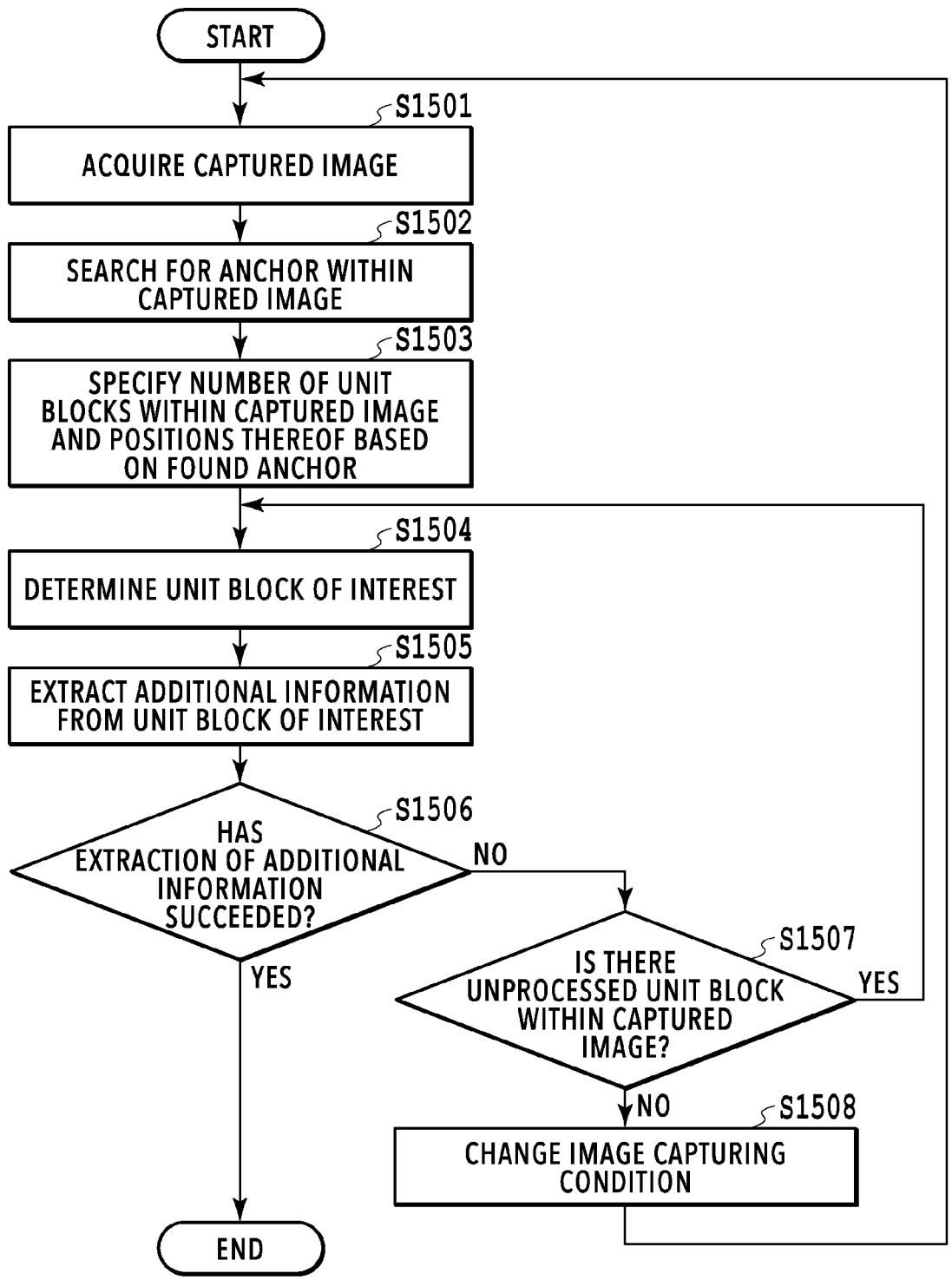
FIG. 15 is a flowchart showing a flow of image capturing control at the time of extracting additional information from printed matter.

FIG. 15 is a flowchart showing a flow of image capturing control for acquiring a captured image suitable to extraction of additional information. In the present embodiment, automatic execution of the series of processing by an image reading application (program) installed in the mobile terminal 110 is supposed, but it may also be possible to manually perform partial processing, such as changing of the image capturing condition. In the following, detailed explanation is given along the flow in FIG. 15.

At step 1501, a captured image of printed matter is acquired in response to image capturing instructions of a user via the operation unit 214 of the mobile terminal 110. The image capturing condition at this time is arbitrary and it may be possible to perform image capturing by using AF, AE, AWB, and so on described previously. Data of the acquired captured image is stored in an area secured within the RAM 212 after geometric transformation, such as affine transformation, is performed therefor as needed.

At step 1502 that follows, the anchor described previously is searched for by taking the acquired captured image as a target. In the present embodiment, the portion of the anchor is covered over with patterns whose read value is "0" and in the case where "0" continues for 32 pixels in the horizontal direction, the row is determined to be an "anchor row". Then, in the case where the "anchor row" continues for 32 pixels in the vertical direction, the area is determined to be an anchor. By performing this processing for the entire captured image, information (anchor information) indicating how many anchors exist in the captured image and where each anchor exists within the captured image is obtained. The obtained anchor information is stored in the RAM 212.

At step 1503, based on the anchor found at step 1502, the number of unit blocks existing within the captured image and the positions thereof are specified. Specifically, by calculating the coordinates of the unit block by referring to the above-described anchor information, information (unit block information) indicating the total number of unit blocks existing within the captured image and where each unit block exists within the captured image is obtained. The obtained unit block information is stored in the RAM 212.

At step 1504, a unit block on which attention is focused is determined from the unit blocks existing in the captured image. At step 1505 that follows, extraction of additional information described previously is performed by taking the unit block of interest as a target. Then, at step 1506, whether or not extraction of embedded additional information has succeeded is determined. For example, in the case of FIG. 11A described previously, on a condition that all pieces of additional information corresponding to one unit block have been extracted, it is determined that the extraction has succeeded. Further, in the case of FIG. 11B, on a condition that all pieces of additional information corresponding to one set of two adjacent unit blocks have been extracted, it is determined that the extraction has succeeded. As the case where a plurality of unit blocks is handled as one set, for example, there may be a case where the first block is arranged on the first printed matter and the second block is arranged on the second printed matter. In such a case, a user captures the second printed matter after capturing the first printed matter. Here, explanation is given by taking the case where the number of blocks is two and the number of pieces of printed matter is two as an example, but it is not necessary to limit the case to this. In the case where the extraction of additional information has succeeded, this processing is terminated. On the other hand, in the case where the extraction of additional information has failed, the processing advances to step 1507.

At step 1507, whether the extraction processing of additional information has been performed for all the unit blocks existing within the captured image is determined. In the case where there is an unprocessed unit block, the processing returns to step 1504, and the next unit block of interest is determined and the processing is continued. On the other hand, in the case where the extraction processing of additional information has been completed for all the unit blocks, the processing advances to step 1508.

At step 1508, the image capturing condition is changed for the next image capturing. For example, as described previously, the focus position is changed automatically. The image capturing condition to be changed is not limited to the focus position and for example, it may also be possible to change the zoom magnification at the same time so that the image capturing target is captured larger. In addition, it may also be possible to change the exposure, the white balance, the image quality mode of a built-in camera (for example, high-definition mode and low-definition mode), the shutter speed, and so on. At this time, it is sufficient to determine in advance the way which item is changed as a target (amount of change and the like) in association with, for example, the format of image capturing-target printed matter, the image capturing environment, and so on. Further, it may also be possible to give priority to each item and to change in the order from the item with the highest priority. After the image capturing condition is changed, the processing returns to step 1501 and image capturing in accordance with the newly set image capturing condition is performed and the processing is continued for a reacquired captured image as a target. Further, as a method of changing the image capturing condition, it may also be possible to change the image capturing condition in the case where the image reading application determines No at step 1507 or another method may be used. For example, a user holds the mobile terminal in his/her hand and performs image capturing by bringing the position α into focus. Here, it is assumed that the data portion of the area 1202 in FIG. 12B cannot be acquired from the image obtained by image capturing with the position α being in focus. As a result of this, a progress bar indicating progress of the extraction processing of additional information, which is displayed by the image reading application, stops on the way. Then, there is a case where a user recognizes that the progress bar has stopped on the way and changes the distance between the mobile terminal 110 and the printed matter. Then, the image capturing condition is changed in response to the change in the distance between the mobile terminal 110 and the printed matter, and therefore, it is possible to make use of the change of the image capturing condition as the processing at step 1508. That is, the image capturing condition may be changed without the image reading application notifying the built-in camera of the change of the image capturing condition.

The above is the contents of the image capturing control for acquiring a captured image suitable to extraction of additional information. Due to this, for example, in the example in FIG. 13 and FIG. 14 described previously, in the case where image capturing is performed by bringing the position α into focus in the first image capturing and extraction of additional information fails, image recapturing is performed automatically by bringing the position β or γ into focus. Because of this, it is possible to efficiently obtain a captured image suitable to extraction of additional information. As the extraction processing of additional information, additional information may be extracted from only the image acquired by image recapturing, or additional information extracted from each of a plurality of images obtained by a plurality of times of image capturing may be combined. Here, both pieces of extraction processing are explained by taking an example. For example, it is assumed that image capturing is performed by bringing the position α into focus and as a result of this, the data portions of the areas 1201 and 1203 in FIG. 12A and FIG. 12B are extracted, but extraction of the data portion of the area 1202 fails. In such a case, it is determined that the extraction of additional information has failed at step 1506. Then, it is possible to acquire the block at the position β by performing image recapturing by bringing the position β into focus. Here, additional information may be extracted from only the recaptured image. Further, similarly as described above, for example, it is assumed that image capturing is performed by bringing the position α into focus and as a result of this, the data portions of the areas 1201 and 1203 in FIG. 12A and FIG. 12B are extracted, but extraction of the data portion of the area 1202 fails. In such a case, it is determined that the extraction of additional information has failed at step 1506. Then, it is possible to acquire the block at the position β by performing image recapturing by bringing the position β into focus. At this time, the data portions of the areas 1201 and 1203 within the block have already been acquired, and therefore, the CPU 210 makes an attempt to acquire the data portion of the area 1202 of the block obtained by image recapturing. Here, in the case where the data portion of the area 1202 of the block obtained by image recapturing is acquired, additional information may be acquired by combining the data portions of the areas 1201 and 1203 acquired by the first image capturing and the data portion of the area 1202 obtained by image recapturing. In this case, an attempt is made to acquire the data portion from only the area of the portion that lacks at the time of image recapturing, and therefore, it is possible to improve efficiency of the processing.

Further, it may also be possible to change the image capturing condition other than the focus position, for example, the zoom magnification at the same time. In the present embodiment, each time extraction of additional information fails, image recapturing is performed by changing the image capturing condition, but this is not limited. For example, it may also be possible to perform consecutive image capturing or image capturing of a moving image while changing the image capturing condition and to sequentially perform the flow in FIG. 15 described above for a plurality of still images by consecutive image capturing or a plurality of frame images making up a moving image as a target.

The additional information obtained by the above processing is displayed in parallel with the printed matter being captured. For example, a message corresponding to the additional information is displayed by being superimposed on the printed matter being captured. Further, in the case where the obtained additional information is a URL, a Web page or a moving image corresponding to the URL is displayed. In this case, there is a possibility that an application corresponding to the URL is newly activated and only the page corresponding to the URL is displayed.

MODIFICATION EXAMPLE

The example is explained above in which extraction of additional information is performed by using another captured image obtained by performing image capturing by changing the focus position and the like in the case where additional information cannot be extracted successfully. Next, as a modification example, an aspect is explained in which a combined image is generated from a plurality of captured images whose focus positions and the like are different and extraction of additional information is performed from the combined image.

Figure 16:
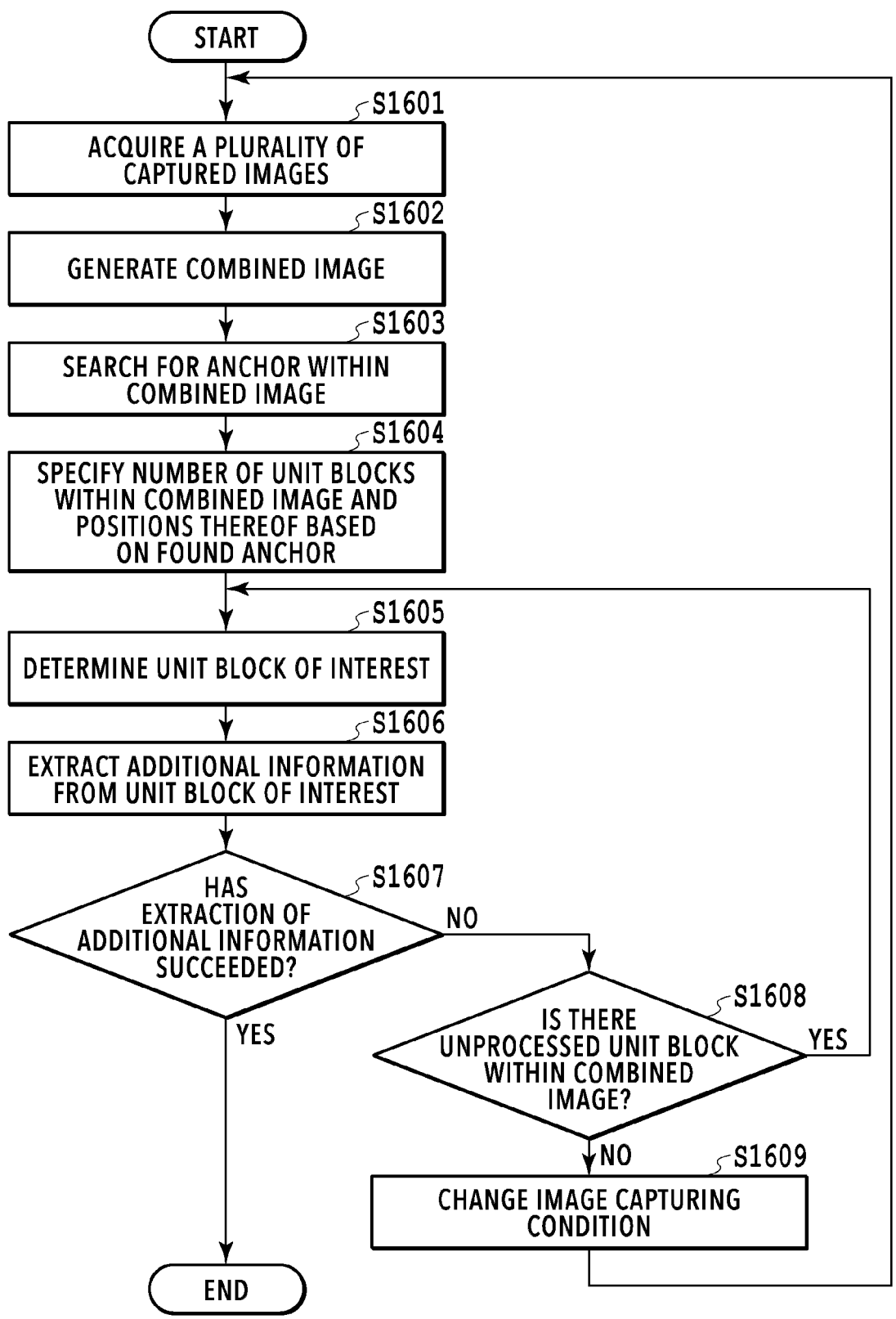
FIG. 16 is a flowchart showing a flow of image capturing control at the time of extracting additional information from printed matter.

FIG. 16 is a flowchart showing a flow of image capturing control for acquiring a captured image suitable to extraction of additional information according to the present modification example. In the following, explanation is given along the flow in FIG. 16, but the contents in common to those of the flow in FIG. 15 described previously are omitted or simplified and in the following, different points are explained mainly.

At step 1601, a plurality of captured images covering the entire printed matter is acquired by image capturing in response to image capturing instructions of a user via the UI of the mobile terminal 110. At this time, as described previously, the image capturing condition, for example, such as the focus position, is changed appropriately and then image capturing is performed. Data of a plurality of acquired captured images is stored in an area secured within the RAM 212.

At step 1602, a combined image corresponding to the entire printed matter is generated by using a plurality of acquired captured images. Specifically, a combined image corresponding to the entire printed matter is generated by modifying a plurality of captured images captured so as to cover the printed matter into captured images with no distortion by performing geometric transformation, for example, such as affine transformation, for each of the plurality of captured images, and linking the images after transformation together.

Step 1603 to step 1609 that follow correspond to step 1502 to step 1508, respectively, of the flow in FIG. 15. That is, first, the anchor search described previously is performed by taking the generated combined image as a target (step 1603) and based on the found anchor, the number of unit blocks within the combined image and the positions thereof are specified (step 1604). Then, extraction processing of additional information is performed for each unit block (steps 1605 and 1606) and in the case where additional information cannot be extracted from the combined image, image capturing is performed again under a new image capturing condition (steps 1607 to 1609, step 1601). Then, the processing is continued by taking a new combined image generated based on the recaptured image (step 1602) as a target.

The above is the contents of the image capturing control for acquiring a captured image suitable to extraction of additional information according to the present modification example. This modification example is effective in the case where the amount of additional information is large, for example, in the case where the number of unit blocks corresponding to one set corresponding to one piece of additional information is large, or the unit block itself, which serves as a base, has a large size. Further, in the case of additional information that is meaningless unless each piece of additional information embedded in a plurality of pieces of printed matter is read, it may also be possible to acquire a captured image (or combined image) corresponding to each of the plurality of pieces of printed matter and to generate an image by combining the captured images.

As above, according to the present invention, in the case where image capturing for extracting additional information embedded in printed matter is performed by using a built-in camera of a mobile terminal, a plurality of captured images whose image capturing condition is changed is used. Due to this, even in the case of unstable handheld image capturing, it is possible to obtain a captured image capable of reading of additional information and to easily extract additional information.

It may also be possible for the above-described image reading application to include a function to generate additional information, a function to generate print data in which additional information is embedded, and so on, in addition to the function relating to extraction of additional information embedded in printed matter. That is, the image reading application may include the functions of the above-described embedment processing unit 101. By installing the image reading application such as this in a mobile terminal, it is also possible for a user to cause an image forming apparatus to print printed matter in which additional information is embedded and to extract additional information from image capturing results of printed matter.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the present invention, it is possible to easily extract additional information from printed matter by using a built-in camera of a mobile terminal.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-126735 filed Jun. 28, 2017, which is hereby incorporated by reference wherein in its entirety.

What is claimed is:

1. An information processing apparatus that reads additional information by capturing printed matter in which the additional information is embedded by using a built-in camera, the information processing apparatus comprising:
   a control unit configured to acquire a first captured image obtained by capturing the printed matter under a first image capturing condition,
   an extraction unit configured to extract the additional information from a predetermined block of the first captured image;
   a first determination unit configured to determine whether extraction of the additional information from the predetermined block has succeeded; and
   a second determination unit configured to determine whether an another unprocessed block exists in the first captured image, in a case where the first determination unit determines that extraction of the additional information from the predetermined block of the first captured image has not succeeded,
   wherein the control unit, in a case where the second determination unit determines that the another unprocessed block does not exist in the first captured image, acquires a second captured image obtained by capturing the printed matter under a second image capturing condition different from the first image capturing condition,
   wherein the extraction unit,
   in a case where the second determination unit determines that the another unprocessed block exists in the first captured image, extracts additional information from the another unprocessed block in the first captured image, and
   in a case where the second determination unit determines that the another unprocessed block does not exist in the first captured image, extracts additional information from the second captured image, and
   wherein the control unit, the extraction unit, the first determination unit, and the second determination unit are implemented by at least one processor of the information processing apparatus.

2. The information processing apparatus according to claim 1, wherein
   in a case where extraction of the additional information from the first captured image has succeeded in the extraction unit, the control unit does not acquire the second captured image and
   in a case where extraction of the additional information from the first captured image has not succeeded in the extraction unit, the control unit acquires the second captured image by changing the first image capturing condition to the second image capturing condition and the extraction unit extracts the additional information by analyzing the first captured image and the second captured image.

3. The information processing apparatus according to claim 1, wherein
   the extraction unit extracts predetermined additional information by combining the additional information acquired from the first captured image and the additional information acquired from the second captured image.

4. The information processing apparatus according to claim 1, wherein
   the control unit acquires a captured image of the printed matter by performing consecutive image capturing or image capturing of a moving image while changing the image capturing condition, and
   the extraction unit extracts the additional information by analyzing a plurality of still images obtained by consecutive image capturing or a plurality of frame images making up a moving image.

5. The information processing apparatus according to claim 4, wherein
   in a case where extraction of the additional information has not succeeded in the extraction unit, the control unit reacquires a captured image of the printed matter by performing the consecutive image capturing or image capturing of a moving image again, and
   the extraction unit extracts the additional information by analyzing a plurality of reacquired still images or reacquired frame images.

6. The information processing apparatus according to claim 1, wherein
   the control unit generates a combined image from captured images in accordance with at least two kinds of image capturing condition, and
   the extraction unit extracts the additional information by analyzing the combined image.

7. The information processing apparatus according to claim 6, wherein
   the control unit generates, in a case where extraction of the additional information has not succeeded in the extraction unit, the combined image by reacquiring captured images in accordance with the at least two kinds of image capturing condition, and the extraction unit extracts the additional information by analyzing the combined image generated based on the reacquired captured images.

8. The information processing apparatus according to claim 1, wherein the additional information is embedded repeatedly in units of blocks in image information on the printed matter by being multiplexed, and the extraction unit extracts the additional information from the captured image by performing an analysis in the units of blocks.

9. The information processing apparatus according to claim 1, wherein the image capturing condition is at least one of a focus position, a zoom magnification, exposure, white balance, an image quality mode of the built-in camera, and a shutter speed.

10. A control method of a mobile information processing apparatus that reads additional information by capturing printed matter n which the additional information is embedded by using a built-in camera, the control method comprising the steps of:

acquiring a first captured image obtained by capturing the printed matter under a first image capturing condition, extracting the additional information from a predetermined block of the first captured image;

determining, as a first determination, whether extraction of the additional information from the predetermined block has succeeded; and determining, as a second determination, whether an another unprocessed block exists in the first captured image, in a case where the first determination determines that extraction of the additional information from the predetermined block of the first captured image has not succeeded; and in a case where the second determination determines that the another unprocessed block does not exist in the first captured image, acquiring a second captured image obtained by capturing the printed matter under a second image capturing condition different from the first image capturing condition, wherein, in a case where the second determination determines that the another unprocessed block exists in the first captured image, the extracting extracts additional information from the another unprocessed block in the first captured image, and in a case where the second determination determines that the another unprocessed block does not exist in the first captured image, the extracting extracts additional information from the second captured image.

11. The control method according to claim 10, wherein in a case where extraction of the additional information from the first captured image has succeeded, the second captured image is not acquired, and in a case where extraction of the additional information from the first captured image has not succeeded, the second captured image is acquired by changing the first image capturing condition to the second image capturing condition and the additional information is extracted by analyzing the first captured image and the second captured image.

12. The control method according to claim 10, wherein the extracting extracts predetermined additional information by combining the additional information acquired from the first captured image and the additional information acquired from the second captured image.

13. The control method according to claim 10, wherein a captured image of the printed matter is acquired by performing consecutive image capturing or image capturing of a moving image while changing the image capturing condition, and at the extraction step, the additional information is extracted by analyzing a plurality of still images obtained by consecutive image capturing or a plurality of frame images making up a moving image.

14. The control method according to claim 13, wherein in a case where extraction of the additional information has not succeeded, a captured image of the printed matter is reacquired by performing the consecutive image capturing or image capturing of a moving image again, and at the extraction step, the extraction is performed again by analyzing a plurality of reacquired still images or a plurality of reacquired frame images.

15. The control method according to claim 10, wherein a combined image is generated from captured images in accordance with at least two kinds of image capturing condition, and at the extraction step, the extraction is performed by analyzing the combined image.

16. The control method according to claim 15, wherein in a case where extraction of the additional information has not succeeded, the combined image is generated by changing the image capturing conditions and reacquiring captured images in accordance with the at least two kinds of image capturing condition, and the extraction is performed by analyzing the combined image generated based on the reacquired captured images.

17. The control method according to claim 10, wherein the image capturing condition is at least one of a focus position, a zoom magnification, exposure, white balance, an image quality mode of the built-in camera, and a shutter speed.

18. A non-transitory computer readable storage medium storing a program for causing a computer to perform a control method of a mobile information processing apparatus that reads additional information by capturing printed matter in which the additional information is embedded by using a built-in camera, the control method comprising the steps of:

acquiring a first captured image obtained by capturing the printed matter under a first image capturing condition, extracting the additional information from a predetermined block of the first captured image determining, as a first determination, whether extraction of the additional information from the predetermined block has succeeded; and determining, as a second determination, whether an another unprocessed block exists in the first captured image, in a case where the first determination determines that extraction of the additional information from the predetermined block of the first captured image has not succeeded, and in a case where the second determination determines that the another unprocessed block does not exist in the first captured image, acquiring a second captured image obtained by capturing the printed matter under a second image capturing condition different from the first image capturing condition, wherein, in a case where the second determination determines that the another unprocessed block exists in the first captured image, the extracting extracts additional information from the another unprocessed block in the first captured image, and in a case where the second determination determines that the another unprocessed block does not exist in the first captured image, the extracting extracts additional information from the second captured image.

\* \* \* \* \*